(12) United States Patent
Saijo et al.

(10) Patent No.: US 6,257,267 B1
(45) Date of Patent: Jul. 10, 2001

(54) SAFETY VALVE ELEMENT FOR CAPACITOR AND CAPACITOR CASE LID WITH SAFETY VALVES

(75) Inventors: Kinji Saijo; Kazuo Yoshida; Nobuyuki Yoshimoto; Yoshihiko Isobe, all of Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/242,097

(22) PCT Filed: Aug. 5, 1997

(86) PCT No.: PCT/JP97/02721

§ 371 Date: Feb. 8, 1999

§ 102(e) Date: Feb. 8, 1999

(87) PCT Pub. No.: WO98/06117

PCT Pub. Date: Feb. 12, 1998

(30) Foreign Application Priority Data

Aug. 6, 1996 (JP) .................................... 8-221826

(51) Int. Cl.$^7$ .................................................. F16K 17/16
(52) U.S. Cl. ........................ 137/68.23; 220/89.2; 361/521
(58) Field of Search ..................... 137/68.23; 220/89.1, 220/89.2; 361/521

(56) References Cited

U.S. PATENT DOCUMENTS

| | | | |
|---|---|---|---|
| 2,203,902 | * 6/1940 | Georgiev | 220/89.2 |
| 3,688,162 | 8/1972 | Willy et al. | 361/521 |
| 3,852,647 | * 12/1974 | Ishii | 361/521 |
| 3,878,440 | * 4/1975 | Ando | 361/521 |
| 4,115,629 | * 9/1978 | Dey et al. | 361/521 X |
| 4,245,010 | * 1/1981 | Golz | 429/56 |
| 4,495,147 | * 1/1985 | Fricker et al. | 137/68.23 X |
| 4,550,743 | * 11/1985 | McFarlane et al. | 137/68.23 |
| 4,612,739 | * 9/1986 | Wilson | 137/68.23 X |
| 6,150,037 | * 11/2000 | Saijo et al. | 137/68.23 X |

FOREIGN PATENT DOCUMENTS

| | | |
|---|---|---|
| 0068836 | 1/1983 | (EP) . |
| 887396 | 11/1943 | (FR) . |

\* cited by examiner

Primary Examiner—John Rivell
(74) Attorney, Agent, or Firm—Browdy and Neimark

(57) ABSTRACT

The object of the present invention is to provide safety valve elements for condenser use, which rupture precisely at a predetermined pressure especially stably in a low pressure range so as to release inner pressure outside and can be manufactured readily, and to provide a condenser which incorporates the safety valve elements.

The safety valve elements for condenser use according to the present invention comprises a metal substrate A which is provided with a perforated opening C and a metal foil B laid over the metal substrate A to close the perforated opening C.

17 Claims, 4 Drawing Sheets

SAFETY VALVE ELEMENT FOR CAPACITOR AND CAPACITOR CASE LID WITH SAFETY VALVES

FIELD OF THE INVENTION

The present invention relates to especially safety valve elements for condenser use which can be broken off at the low prescribed presser and release the internal presser, condenser case lids provided with safety valves and condensers produced by employing such safety valve elements and condenser case lids.

PRIOR ARTS

Conventionally, a condenser which uses an organic solvent as an electrolyte sometimes suffers rupture when the pressure in the condenser is abnormally elevated. To prevent the occurrence of such rupture when the pressure in the condenser is excessively increased, various safety valves with different mechanisms have been proposed in the request of safety valves capable of releasing inner pressure outside. The safety valves need to be operated particularly at a low pressure of not more than 2 to 5 kgf/cm$^2$ so as to assure the safety for fear that broken pieces or contents of the condenser would scatter outside to thereby hurt human body, if the condenser ruptures by a chance.

The condenser which uses an organic solvent as the electrolyte requires to have high sealability. A Japanese laid-open publication SHO 63-285859 discloses a safety valve used in the condenser required of such a high realability, which can release the inner pressure of such condenser outside when its inner pressure is excessively elevated.

In this condenser, a part of the wall of the condenser vessel is thinned by cold rolling using a press device until the thickness of the rolled part becomes half of the initial thickness thereof. Accordingly, when the inner pressure is elevated and reaches a predetermined pressure, the thinned wall part is ruptured and the inner pressure is released outside.

To release the inner pressure at a low pressure of not more than 30 kg/cm$^2$, the thinned wall part should be made considerably thin. And, during press working to obtain an extremely thin wall part, fine or minute cracks may occur in the thinned wall part, and once such cracks occur, sealability of the vessel is spoiled. Although the thinned wall part is hardened by such press working, it is not uniformly hardened.

Accordingly, the release valve as mentioned above has another drawback that even if the thinned wall part is pressed to have a uniform thickness, it does not always rupture at a constant pressure.

Furthermore, an etching method has been proposed to make thinner a part of the wall of the condenser vessel, however, it is extremely difficult to control the thickness of the thinned wall part at a prescribed thickness after etching. Besides the thinned wall part is apt to suffer pinholes, which needs a pinhole test for detecting the pinholes of all the thinned wall parts after etching.

Thus, when using the above mentioned method, it is extremely difficult to obtain a thinned wall part having a uniform thickness. Especially in a case that the safety valve is to be operated for the pressure releasing at a low pressure of not more than 30 kgf/cm$^2$ a reliable reproductivity of the pressure releasing operation cannot be achieved.

There is another method for releasing inner pressure outside proposed. For instance, Japanese laid-open publication HEI 2-304861 discloses a valve chest provided at a part of an outer vessel with a valve aperture to be communicated with the inside of the condenser and an outlet to be communicated with outside of it, in which a valve element at least whose one surface facing the valve aperture is made of rubber, and an elastic element for pressing the above mentioned rubber surface of the valve element to the valve aperture.

According to this method, the releasing pressure of the safety valve is naturally determined from the elastic modulus of the elastic element and the area of the valve element exposed to pressure, and it can be easily selected in an optional range from a low pressure of 10 kgf/cm$^2$ down to 1 kgf/cm$^2$ to a high pressure of 50 kgf/cm$^2$. This method, however, cannot provide such high sealability as required for the condenser which uses organic solvent as the electrolyte.

SUMMARY OF THE INVENTION

Accordingly, it is an object of the present invention to provide safety valve elements for condenser use, which stably operates especially in a low pressure range and rupture precisely at a predetermined pressure for releasing inner pressure outside and can be manufactured readily, and provide a condenser which incorporates the safety valve elements.

The safety valve elements for condenser use according to the present invention comprises a metal substrate which is provided with a perforated opening and a metal foil laid over the metal substrate so as to close the perforated opening.

Such safety valve elements for condenser use may preferably be provided with a plurality of perforated openings. The metal substrate may be made of an aluminum sheet or aluminum alloy sheet and the metal foil is desirably made of an aluminum foil. The condenser case lid is produced by forming a perforated opening in the metal substrate, pressure welding the metal foil to the metal substrate so as to close the perforated opening and molding the metal substrate into a case lid form. The condenser employs the above mentioned safety valve elements for condenser use, and the condenser employs the above mentioned condenser case lid with the safety valve elements.

DETAILED DESCRIPTION OF THE PREFERRED EMBODIMENT

The safety valve elements for condenser use according to the present invention can readily provide a rupture portion having a uniform thickness so that the irregularity on inner pressure which causes rupture can minimized. Accordingly, when such a safety valve element for a condenser use is applied as a safety valve for condenser use, they can be reliably operated with its stable operating pressure.

The safety valve element for condenser use according to the present invention is made of a composite material which is produced using cold pressure welding so that the lowering of the strength of material can be minimized compared to that produced by the conventional high temperature heat welding method. Therefore, the operating pressure of the safety valve can be stabilized.

Furthermore, the condenser case lid according to the present invention is formed after the metal substrate is provided with a perforated opening and pressure welded together with the metal foil serving as a safety valve. Therefore, it is possible to directly and readily obtain the condenser case lid, which is provided with a portion to be ruptured as a safety valve.

Furthermore, the condenser which incorporates the safety valve elements for condenser use according to the present invention can be operated in a stable operating pressure range, which assures an optimum safety.

The present invention is hereinafter explained more in detail in accordance with the embodiments.

Figure 1:
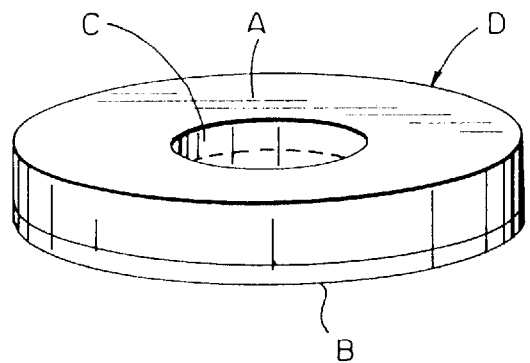
FIG. 1 is a schematic perspective view of a safety valve element for condenser use according to the present invention.
Figure 2A:
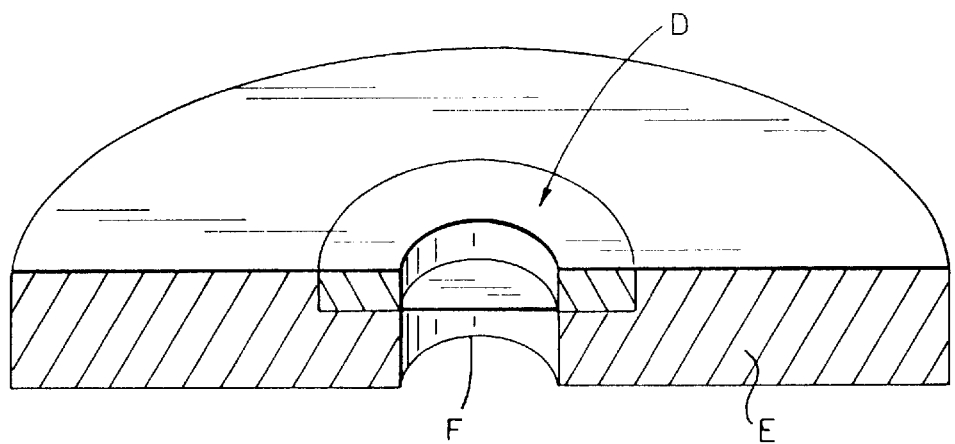
FIGS. 2A and 2B are schematic perspective view showing the manner of mounting the safety valve elements to a condenser case lid according to the present invention.
Figure 2B:
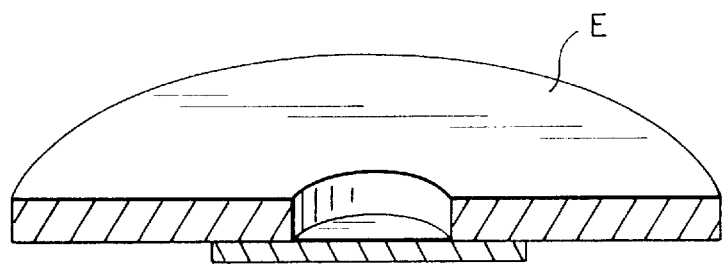
Figure 3:
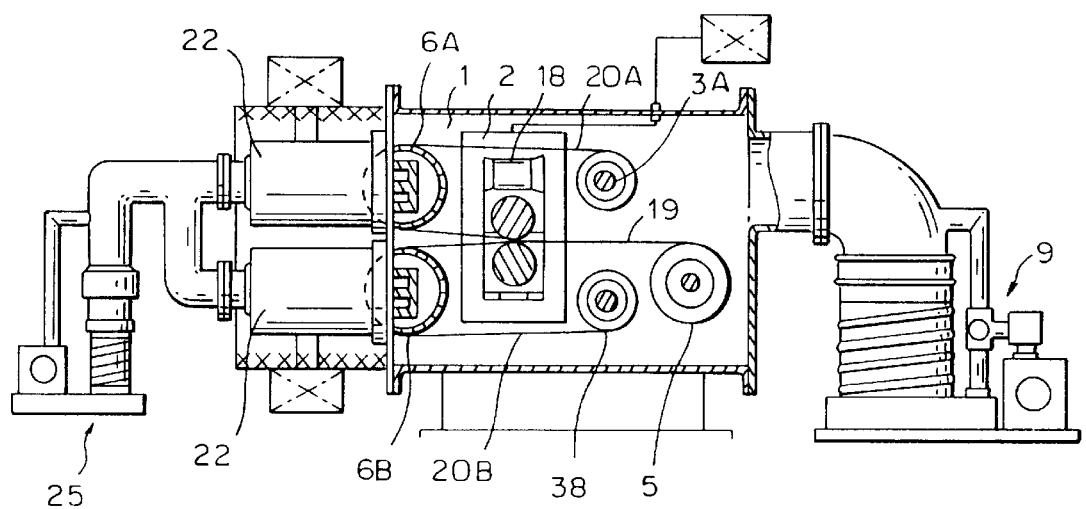
FIG. 3 is a schematic perspective view showing a manner of producing a composite material.
Figure 4:
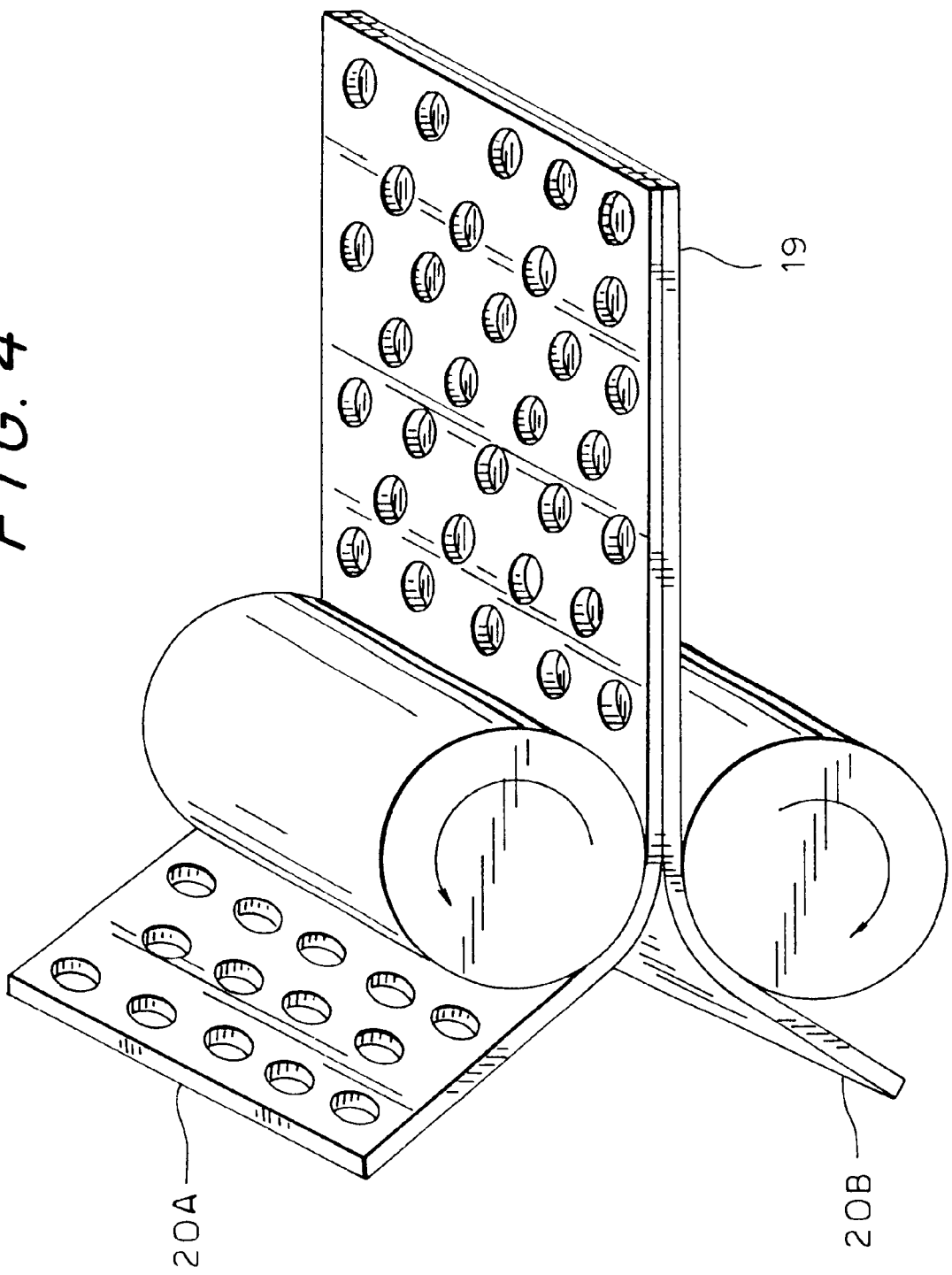
FIG. 4 is a schematic perspective view showing the manner of producing the composite material.

FIG. 1 is a schematic perspective view of a safety valve element for condenser use according to the present invention. FIG. 2 is a schematic perspective view showing the manner of mounting the safety valve element to a condenser case lid according to the present invention. FIGS. 3 and 4 are schematic perspective views showing a manner of producing a composite material. In FIG. 1, A is a metal substrate, B is a metal foil, and C is a perforated opening.

A safety valve element D according to the present invention is predetermined to be operated at a low pressure of not more than 2 to 5 kgf/cm$^2$. To attain this object, metal foil B used for the present invention may have a thickness of 5 to 50 $\mu$m depending on the shape of perforated opening. When safety valve element D is mounted on a condenser or the like as a safety valve, wherein the thickness of metal foil B is not more than 5 $\mu$m, such metal foil is easily broken at an impact of dropping or so.

On the other hand, when safety valve element D is mounted on a condenser or the like as a safety valve, wherein the thickness of metal foil B is 50 $\mu$m or more, such metal foil B does not rupture until a more than 30 kgf/cm$^2$ pressure is applied to the safety valve. Resultantly, when the inner pressure of the condenser is excessively elevated, the condenser vessel itself ruptures, and so broken pieces of the condenser vessel scatter, or the contents blow off, which may possibly impair the safety. Besides, such a thick metal foil is not economically favorable.

Metal foil B is made of aluminum preferably selected from a group of JIS A1085, AIN 30 or others.

Although metal foil B can be produced in any known methods, it is generally produced by thinning a strip by cold rolling or by further annealing the cold rolled strip.

Although the thickness of a metal sheet used for metal substrate A is not specifically limited, it should usually be 0.03 to 0.50 mm and preferably 0.05 to 0.10 mm in view of the strength and economy, since the safety valve is rather readily mounted on the vessel using welding or calking methods.

The kinds of aluminum metal used for metal substrate A may preferably be JIS1000 type, 3000 type, and 5000 type.

Although metal substrate A can be produced by any methods, in general, a metal sheet which is thinned by cold rolling is used as metal substrate A as it is, or a metal sheet which is produced by annealing the thinned metal sheet after cold rolling is used.

Metal substrate A is provided with at least one perforated opening C. The size and shape of one perforated opening C is selected depending on the size and shape of the vessel on which safety valve element D is mounted. Accordingly, there is no restriction on the size and shape of perforated opening C. In general, perforated opening C is preferably be of a circular shape having a diameter of 1 to 10 mm. Perforated opening C can be of an elliptical shape having a longitudinal axis length of 1 to 10 mm or of a polygonal shape having a diagonal length which corresponds to the diameter of the above mentioned circular shape.

The shape of perforated opening C can be a section of a line such as a straight or curved slit having a desired width.

Furthermore, the shape of perforated opening C can be a geometrical pattern which is a combination of several kinds of above mentioned figures so that stress concentration may occur to thereby lower the operating pressure.

Perforated opening C is formed in a desired shape by punching a thin sheet which is formed by cold rolling, for example, by use of a punching press.

In a case where a plurality of perforated openings C are formed in metal substrates A, these perforated openings C are preferably arranged in a geometrical manner such as a lattice pattern or a zigzagging pattern. The pitch or interval between the perforated openings C is determined in a desired manner in view of the size of the safety valve member. Although the manner of forming such perforated openings is not specifically restricted, they may be formed in conventional manners such as punching out the metal substrate with a punching press or an etching method.

Furthermore, one safety valve element D for condenser use may be provided with a plurality of perforated openings C. Safety valve element D may also be produced by cold pressure welding metal foils B to both sides of metal substrate A. In this case, when some forces other than the elevated inner pressure of the vessel, like an impact of dropping, are applied to the condenser incorporating such safety valve element, and then, if one metal foil provided on one surface of the metal substrate is broken, the safety valve can maintain its safety function as long as the other metal foil provided on the other surface of the metal substrate is not broken.

FIG. 2 shows an example of a manner of mounting safety valve element D on a condenser case lid E. In FIG. 2, condenser case lid E is beforehand provided with an opening F and safety valve element D is mounted on the upper side of condenser case lid E. The periphery of safety valve element D is fused by laser beams and welded to condenser case lid E such that safety valve element D hermetically closes opening F of condenser case lid E.

Although, as described above, safety valve element D for condenser use is usually mounted on the vessel by welding such that safety valve element D closes an opening which is formed in a part of the vessel or outer can of the condenser, it is possible to form a condenser case lid E directly from a metal substrate having a thickness greater than that of the ordinary metal substrate. That is, a perforated opening F is formed in the metal substrate and a metal foil is welded to the metal substrate to close opening F and then the metal substrate is formed molded into condenser case lid E. In this case, the metal foil supports the entirety or a part of the lower surface of condenser case lid E. (See FIG. 2 Next, metal foil B and metal substrate A provided with perforated openings C are pressure welded to each other by cold rolling in a vacuum, for example, by a method as disclosed in Japanese laid-open patent publication HEI 1-224184.

In FIG. 3 and FIG. 4, an apparatus for producing a composite material 19 by pressure welding a metal foil 20B and a metal substrate 20A using cold rolling is shown in a partial cross section. As shown in these drawings, metal substrate 20A and metal foil 20B which are respectively reeled out from uncoilers 3A, 3B are wound around electrode rolls 6A, 6B, portions of which are protruded into an etching chamber 22, and then they are subjected to a sputtering treatment so as to be activated in etching chamber 22. Subsequently, metal substrate 20A and metal foil 20B are subjected to cold rolling by a rolling unit 2 disposed in a vacuum chamber 1 and cold pressure welding, and then they are made into composite material 19, which is, in turn, wound around a coiler 5. Rolling unit 2 is provided with a rolling reduction device 18 for descending the roll. The vacuum level in vacuum chamber 1 is held in a range of $10^{-6}$ to $10^{-6}$ -Torr. by a large-sized vacuum pump 9.

In the production of composite material 19, the magnetron sputtering method is employed for activating metal foil 20B and metal substrate 20A and a high frequency power source having a frequency range of 1 to 50 MHz is employed as a power source for sputtering. When the frequency is less than 1 MHz, it is difficult for the high frequency power source to hold a stable glow discharge, which prevents a continuous etching. On the other hand, when the frequency is more than 50 MHz, the high frequency power source is liable to oscillate and a power supply system becomes unfavorably complicated.

Before starting the etching operation, the vacuum level in etching chamber 22 should be held not more than $1 \times 10^{-4}$ Torr. by means of a vacuum pump (an air exhaust pump) 25 and argon gas is charged into etching chamber 22 so as to produce an argon gas atmosphere with a vacuum level of $10^{-1}$ to $10^{-4}$ Torr. Then, a high frequency current is supplied between etching chamber 22 and vacuum chamber 1, plasma is generated and the surface of metal foil 20B and the surface of metal substrate 20A are both subjected to etching. When the pressure of argon gas is not more than $1 \times 10^{-4}$ Torr., it is difficult to stably keep the glow discharge and a high ion flow cannot be obtained, which prevents a high speed etching.

On the other hand, when the pressure of argon gas exceeds $1 \times 10^{-1}$ Torr., the average free path of the sputtered atoms becomes short, which makes the sputtered atoms be more frequently shot again to the target. Namely, oxygen is separated from the oxide film which has been formed on the surfaces of the metal foil and the metal substrate by etching, and they are again shot to the target, which makes the efficiency of surface activating treatment be lowered. Accordingly, the pressure of argon gas in etching chamber 22 is determined to be in a range of $10^{-1}$ to $10^{-4}$ Torr.

The magnetron sputtering method used for the production of composite material 19 can provide an etching speed of 1000 angstrom/min. or more so that even a stable and thick oxide film formed on the aluminum and titanium can be completely removed in a few minutes. The oxide film formed on the surfaces of copper, steel, stainless steel, and amorphous metal can be removed by etching for a time of a few seconds and thus the metals can obtain almost clean surfaces.

Although the lowering of vacuum level in vacuum chamber 1 decreases the welding strength of the metal foil and the metal substrate, the allowable lower limit of the vacuum level should be $1 \times 10^{-6}$ Torr. in view of industrial economy, while the upper limit should be $1 \times 10^{-3}$ Torr., since this vacuum level still assures a sufficient welding strength.

Further, in the production of composite material 19, it is unnecessary to heat metal foil 20B and metal substrate 20A during cold pressure welding. When these metals are gripped between rolls during cold pressure welding, temperature T of them may be held at a room temperature without causing any problem. However, if cases demand to heat metal foil 20B and metal substrate 20A during cold pressure welding in view of decreasing the difference of the coefficient of the thermal expansion of these metals due to the heat generated at the time of rolling and lessening the deformation of the metals after being cooled, the upper limit of the heating temperature may be in a range of, preferably, not more than 300° C. so as to prevent the occurrence of recrystallizing annealing and the formation of alloy layers or carbide which deteriorate the welding strength between these metals.

The rolling reduction rate at the time of cold pressure welding metal foil 20B and metal substrate 20A should preferably be 0.1 to 30%. Namely, the cold rolling should be carried out with the rolling reduction rate R being in a range as expressed below.

$$0.1 \leq R \leq 30$$

wherein, $$R = (T1 + T2 - TA) \times 100/(T1 + T2)$$

T1: thickness of metal foil before pressure welding
T2: thickness of metal substrate before pressure welding
TA: thickness of composite material after cold pressure welding
R: rolling reduction rate (%)

The lower limit of the rolling reduction rate is determined by the following factors. Namely, although the surface of the plate appears flat at a glance, there are many fine or minute irregularities or indentations in a microscopic level. Therefore, metals come into contact with each other only in their smallest areas unless they are applied with pressure. A conventional cold rolling welding method cannot provide a strong welding even if the surfaces of the metals are sufficiently activated. In the conventional cold rolling welding method, the oxide film on the surfaces of the metals are subjected to a plastic flow by cold rolling with a high rolling reduction rate so that the surfaces of the metals are partially activated and the contact areas are made to increase thereby welding the metals to each other. In such a method, the surfaces of the metals are not necessarily flat. Namely, a metal base plate is preliminarily finished at a reasonable roughness and then subjected to such cold rolling with a high rolling reduction rate so as to make the surfaces flat and smooth.

On the other hand, in the purifying process of the producing method of composite material 19, the surfaces of metal foil 20B and metal substrate 20A have no irregularities or indentations newly formed thereon. Therefore, the metal foil and the metal substrate can be pressure welded in a state that the flatness of their surface which was finished before the pressure welding is maintained. Accordingly, even with a small pressure, the metals can be provided with sufficient contact areas, where a metallic bonding reliably takes place. Thus, even with the small rolling reduction rate, a strong adhering strength can be surely obtained.

Considering a case that the plate is subjected to a cold rolling and a finishing rolling or a refining rolling in one rolling step, the upper limit of the rolling reduction rate is determined to be 30%. It is not desirable that the rolling reduction rate exceeds 30%, since such a high rolling reduction rate induces remarkably high work hardening. Incidentally, the pressure welding operation of the metal foil and the metal substrate may be carried out using a pressurizing mechanism such as a press which is provided with a flat block at one side thereof or flat blocks at both sides thereof, in place of rolling roll.

The present invention is further explained in conjunction with the following preferred examples.

EXAMPLE 1

An aluminum sheet having a thickness of 0.4 mm was perforated using a punching press to provide circular openings of each 7 mm in diameter so as to arrange the circular openings in a lattice pattern with a pitch of 20 mm, thus preparing a metal substrate. The metal substrate and an aluminum foil having a thickness of 20 $\mu$m were inserted into a vacuum chamber of argon gas atmosphere having a vacuum level of $5\times10^{-3}$ Torr. so as to provide an etching of approximately 500 angstrom on one surface of the metal substrate and an etching of approximately 2000 angstrom on one surface of the aluminum foil, which surface was to oppose to the etched surface of the metal substrate, by the magnetron sputtering method. Subsequently, the metal substrate and the aluminum foil were laminated such that the etched surfaces of them were made to contact each other and pressure welded by cold rolling at a temperature of 120° C. and with a rolling reduction rate of 3% to produce a composite material. A plurality of safety valve elements for condenser use were punched from the obtained composite material using the punch press, wherein each valve element was a chip having a diameter of 30 mm and the center thereof was provided with the perforated circular opening of 7 mm in diameter.

The periphery of the safety valve element for condenser use was fused by laser beams and welded to an aluminum pressure vessel such that the valve element hermetically closed the perforated opening provided in the pressure vessel.

Then, an end of the pressure vessel was connected to an air compressor by way of a pressure gauge and the interior of the pressure vessel was pressurized. When the inner pressure of the pressure vessel reached 2 kgf/cm², the aluminum foil of the safety valve element for condenser use ruptured. Thereafter, several safety valve elements for condenser use respectively having circular openings different in diameter were produced in the same manner. Then the inner pressures, at which the aluminum foils of the respective safety valve elements ruptured, were measured. As a result, all the aluminum foils of the safety valve elements for condenser use ruptured at pressures within a stable range of 1 to 5 kgf/cm² (see FIG. 5).

COMPARATIVE EXAMPLE 1

One side of an aluminum sheet which was preliminarily rolled to have a thickness of 0.4 mm was subjected to etching with intervals of 0.1 mm to form a plurality of circular portions of each 7 mm in diameter until the remaining thickness of the etched circular portions came to approximately 20 $\mu$m. A plurality of safety valves which were provided with the half-etched circular portions at the center thereof were produced from the half-etched aluminum sheet in the same manner as that in Example 1. These safety valves were hermetically welded to the aluminum pressure vessels in the same manner as that in Example 1. Then, the interiors of the steel-made pressure vessels were pressurized in the same manner as that in Example 1. As a result, the aluminum half-etched portions of the safety valves ruptured at pressures widely ranging from 3 to 10 kgf/cm².

EXAMPLE 2

An aluminum sheet of JIS A3004 type having a thickness of 0.4 mm was perforated using a punch press to form circular openings each having a diameter of 2 to 7 mm to prepare an aluminum substrate. The aluminum substrate and an aluminum foil (AIN 30, Al085) having a thickness of 30 $\mu$m were inserted into a vacuum chamber of argon gas atmosphere having a vacuum level of $1\times10^{-2}$ Torr. so as to provide an etching of approximately 500 angstrom on one surface of the cold-rolled and perforated aluminum substrate and the same etching on one surface of the aluminum foil, which surface was to oppose to the etched surface of the metal substrate, by the magnetron sputtering method. Subsequently, the aluminum substrate and the aluminum foil were laminated such that the etched surfaces of them were made to contact each other and pressure welded by cold rolling at a room temperature and with a rolling reduction rate of 2% to produce a composite material.

Figure 5:
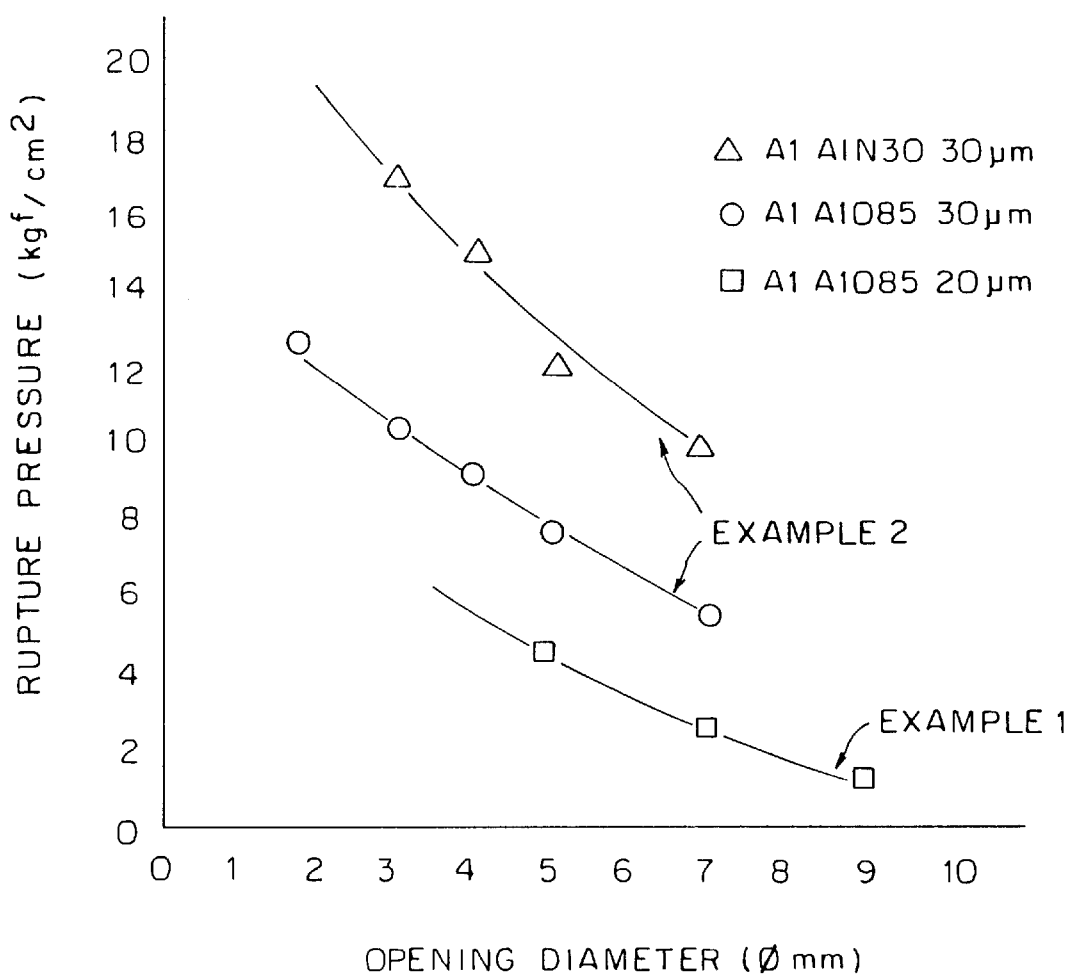
FIG. 5 is a diagram showing the relationship between the size of a safety valve and rupture pressure.

A plurality of safety valve elements for condenser use, each of which has a diameter of 15 mm and the center thereof is provided with a perforated circular opening, were punched from the obtained composite material using the punch press Each of these safety valve elements for condenser use was hermetically welded to an aluminum pressure vessel in the same manner as that in Example 1. Then, the interior of the pressure vessel was pressurized in the same manner as that in Example 1. As a result, as shown in FIG. 5, the safety valve elements for condenser use were able to operate work as safety valves operating within a stable pressure range of 5 to 18 kgf/cm².

COMPARATIVE EXAMPLE 2

One side of a thin aluminum sheet which was preliminarily rolled to have a thickness of 0.4 mm was provided with a plurality of circular dent portions of each 7 mm in diameter in a lattice pattern with a pitch of approximately 10.5 mm such that the remaining thickness of the dent portions was approximately 20 $\mu$m, using the punch press. Seven safety valve elements for condenser use, each of which was provided with the circular dent portion at the center thereof, were produced from the thin aluminum sheet in the same manner as that in Example 1.

These safety valve elements for condenser use were hermetically welded to the pressure vessels in the same manner as that in Example 1. Then, the interiors of the pressure vessels were pressurized in the same manner as that in Example 1. As a result, three of the safety valve elements already suffered micro cracks at the time of press-forming and, therefore, the interiors of the pressure vessels could not be pressurized. In the remaining four safety valve elements, the dent portions thereof ruptured respectively when the inner pressures were ranging from 8 to 33 kgf/cm².

EFFECT OF THE INVENTION

The safety valve elements for a condenser use according to the present invention can readily provide a portion to be ruptured having a uniform thickness so that the safety valve can rupture at inner pressures of the condenser in a stable pressure range. Accordingly, when such a safety valve element for a condenser use is used as a safety valve of various kinds of pressure vessels or the like, they can be reliably operated with its stable operating pressure.

The safety valve element for a condenser use according to the present invention is made of a composite material which is produced using a cold pressure welding so that the lowering of the strength of material can be minimized compared to that by the conventional high temperature heat welding method thus realizing its stable operating pressure.

Furthermore, the condenser case lid according to the present invention is formed after forming a perforated opening in the metal substrate and pressure welding the metal foil, which is to work as a safety valve, to the metal substrate so that the condenser case lid provided with a rupture portion working as a safety valve can be directly and readily produced. Accordingly, when they are used as a condenser case lid with a safety valve, they can be reliably operated with its stable operating pressure.

Furthermore, the condenser which incorporates the safety valve elements for a condenser use according to the present invention can be operated with a stable operating pressure thus assuring an optimum safety.

What is claimed is:

1. A safety valve element for condenser use comprising a metal substrate which is provided with a perforated opening and a metal foil laid over and cold welded to said substrate so as to close said perforated opening, the cold weld being substantially free of alloy layers and carbide.

2. A safety valve element for condenser use according to claim 1, wherein a plurality of perforated openings are formed in said metal substrate.

3. A safety valve element for condenser use according to claim 1, wherein said metal substrate is one selected from a group of steel sheet, stainless steel sheet, copper sheet, and aluminum sheet.

4. A safety valve element for condenser use according to claim 1, wherein said metal foil is one selected from a group of steel foil, stainless steel foil, copper foil, aluminum foil, nickel foil, and nickel-iron alloy foil.

5. A condenser case lid provided with a safety valve element, which is produced by forming an opening in a metal substrate, pressure welding a metal foil to said metal substrate by cold rolling in vacuum without any alloy or carbide being formed, and forming same into said condenser case lid.

6. A condenser employing said safety valve element according to claim 1.

7. A condenser employing said condenser case lid with a safety valve element according to claim 5.

8. A safety valve element for condenser use according to claim 2 wherein said metal substrate is selected from the group consisting of steel sheet, stainless steel sheet, copper sheet, and aluminum sheet.

9. A safety valve element for condenser use according to claim 8 wherein said metal foil is etched and is selected from the group consisting of steel foil, stainless steel foil, copper foil, aluminum foil, nickel foil, and nickel-iron alloy foil.

10. A safety valve element for condenser use according to claim 3 wherein said metal foil is selected from the group consisting of steel foil, stainless steel foil, copper foil, aluminum foil, nickel foil, and nickel-iron alloy foil.

11. A condenser employing said safety valve element according to claim 3.

12. A condenser employing said safety valve element according to claim 9.

13. The condenser of claim 6 wherein said safety valve element is adapted to be operated at a low pressure of not more than 2–5 kgf/cm$^2$ and to rupture at a pressure no greater than 30 kgf/cm$^2$, said metal foil having a thickness of 5–50 $\mu$m.

14. The condenser case lid according to claim 5 wherein said safety valve element is adapted to be operated at a low pressure of not more than 2–5 kgf/cm$^2$ and to rupture at a pressure no greater than 30 kgf/cm$^2$, said metal foil having a thickness of 5–50 +$\mu$m.

15. The condenser of claim 13 wherein said metal foil is aluminum.

16. The condenser case lid of claim 14 wherein said metal foil is aluminum foil.

17. The condenser case lid of claim 5 wherein, prior to said pressure welding, said metal foil and said metal substrate are vacuum etched.

* * * * *